INVENTOR
GERALD MORRELL 3,045,424
METHOD FOR CONTINUOUS VARIATION OF PROPELLANT FLOW AND THRUST IN PROPULSIVE DEVICES
Gerald Morrell, Middleburg Heights, Ohio, assignor to the United States of America as represented by the Administrator of the National Aeronautics and Space Administration
Filed Feb. 24, 1960, Ser. No. 10,812
3 Claims. (Cl. 60—35.3)
(Granted under Title 35, U.S. Code (1952), sec. 266)

The invention described herein may be manufactured and used by or for the Government of the United States of America for governmental purposes without the payment of any royalties thereon or therefor.

This invention pertains to a new and novel method for the thrust variation of propellant propulsive devices by modulation of the propellant flow through density control.

Continuous thrust variation in rocket engines; in other words, throttling, is especially desirable for piloted aircraft applications. In guided missiles, the use of a single powerplant, for both boost and sustainer operation, would be possible also by continuous thrust variation. Another application of this theory in another field of application would be vernier thrust control near cutoff.

Currently, rocket thrust variation is accomplished by using multiple fixed thrust cylinders, each operating at fixed flow, such cylinders being continuously turned on and off. Additionally, there are mechanical devices for opening and closing injector orifices and methods for controlling pump speed in turbopump units. As can be seen, the flow control of these devices makes use of area and velocity variations.

The main disadvantage of the prior methods is that they have an inability to provide continuous thrust variation. Additionally, most of the prior methods add excessive weight to the rocket structure. Additional disadvantages found in these devices are their lack of reliability and repeatability due to vibrations, dynamic instability, and changes in clearances.

This invention applies flow theory of liquid foams to the rocket engine injection process. By foaming the propellants and thereby changing their bulk densities, it is possible to vary rocket thrust continuously. Thus, by applying the foam-flow theory to the injector orifice of a rocket engine, the reduction in the propellant flow becomes a function of the ratio of the flow rates of the inert gas and the propellant. As can be seen, the rate of propellant flow through the injector orifice will decrease as the foaming of the incoming propellant stream is increased. By the simple variance of the inert gas flow, the flow rate of the propellant through the orifice can readily be varied. Naturally, as the flow rate of propellant is varied, the thrust of the engine will vary proportionately.

Thus, an object of this invention is a new method for thrust variation of liquid propellant devices wherein the propellant flow is modulated through density control.

An additional object of this invention is a new method for thrust variation of liquid propellant devices where the propellant density is modulated by foam formation.

A further object of the invention is a new method for thrust variation of liquid propellant devices, which method has mechanical simplicity.

Another object of the invention is a new method for thrust variation of liquid propellant devices, which method embraces flow rate mechanical structures.

A still further object of the invention is a new method for thrust variation of liquid propellant devices, which method has the ability to modulate thrust in a continuous manner.

A still additional object of the invention is a new method for thrust variation of liquid propellant devices, which method is insensitive to vibration.

Other objects and many of the attendant advantages of this invention will be readily appreciated as the same becomes better understood by reference to the following detailed description when considered in connection with the accompanying drawings wherein.

Figure 1:
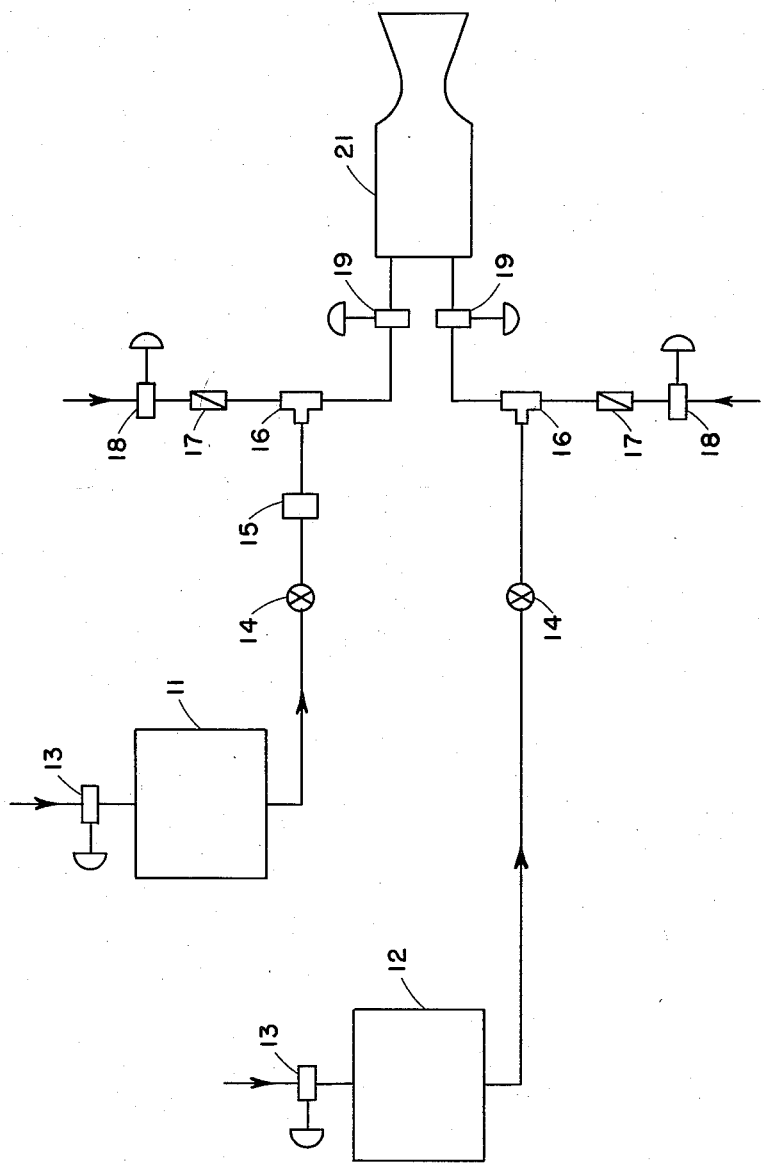
FIG. 1 represents a schematic flow diagram of a rocket system.

Referring now to the drawings, wherein like reference characters designate like or corresponding parts throughout the two views, there is shown in FIG. 1 a typical rocket fuel system using the novel foam control of the oxidant and the fuel. By way of example, the system utilizes an ammonia-white fuming nitric acid mixture with helium used as a pressurizing and foaming gas. Of course, any combination of fuel and oxidant may be used other than those specifically disclosed for the purpose of explaining the system in FIG. 1. Ammonia is stored in tank 11 which is kept under pressure by means of helium gas admitted through the three-way vent valve 13. The ammonia under pressure flows from the tank 11 through the flow meter 14 and before the ammonia reaches the foaming device 16, lithium is added in the flow line from the lithium holder 15. This flow-line addition of lithium metal to the ammonia causes spontaneous ignition when the ammonia and nitric acid reach the combustor. From the lithium holder 15, the ammonia is passed to the foaming device 16. Also admitted to the foaming device 16 is the helium gas necessary to cause the foam. The helium gas is admitted through the vent valve 18 and then passes through a check valve 17 on into the foaming device 16. The foamed ammonia then passes from the foaming device 16 through a flow control valve 19 into the rocket combustor. As will be seen, the oxidant or nitric acid in this example goes through the same process as did the ammonia except for the omission of lithium in the flow line. The acid is stored in tank 12, which is kept under pressure by helium gas being admitted through the three-way vent valve 13. The acid, which is under the pressure of the helium gas, leaves the tank 12 and flows through a flowmeter 14 on into the foaming device 16 wherein it is caused to foam by the admission of helium gas into the device. The helium gas is admitted through the vent valve 18 and then flows through a check valve 17 on into the foaming device 16. After leaving the foaming device 16, the foamed acid passes through a flow control valve 19 into the rocket combustor 21.

Figure 2:
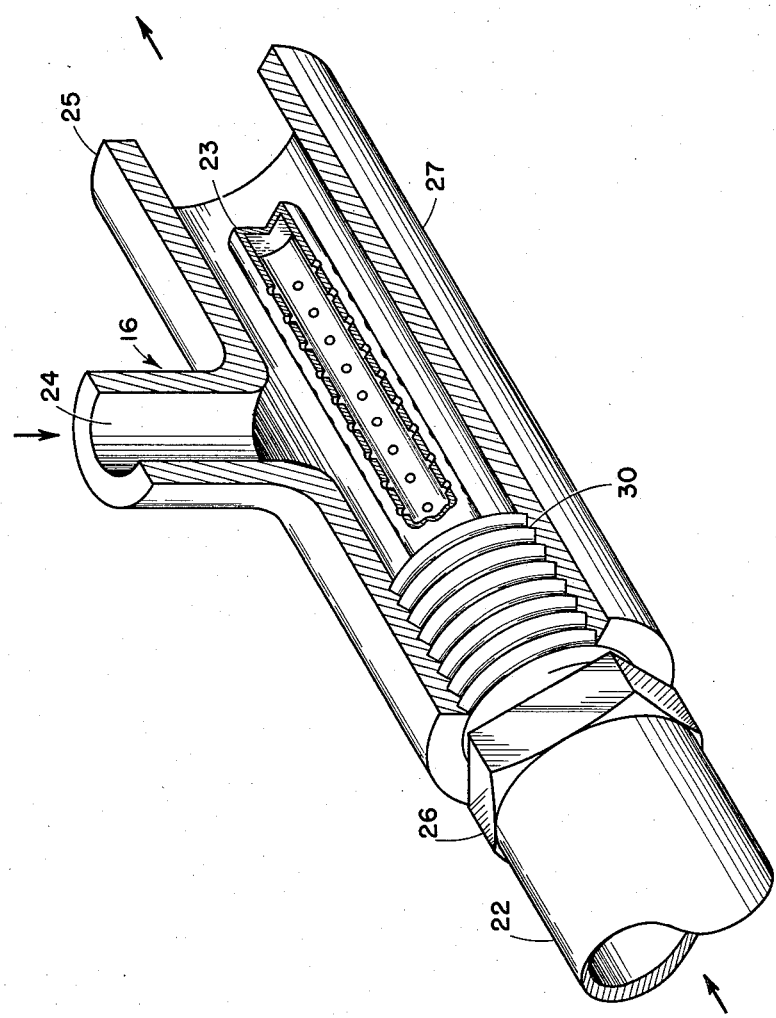
FIG. 2 is a partially-sectioned pictorial view of the foaming device used in the system shown in FIG. 1.

Referring now to FIG. 2 wherein the foaming device 16 is shown, it is seen that the foaming gas is admitted through the pipe 22, which is actually the flow line from the gas storage tank. Attached to the inlet pipe 22, by welding or other conventional means (not shown), is a perforated tube 23. The perforated tube 23 is mounted concentrically within T-joint 27 by thread means 30 on inlet pipe 22 and is secured in place by a lock nut 26. The liquid is admitted through the arm 24 of the joint 27 and is caused to foam by the gas that is emitted through the perforations in the tube 23. The final foamed liquid leaves the device through the arm 25 of the T-joint 27. It is to be noted that the tube 23 is fitted into the T-joint 27 so that the tube axis coincides with the through axis of the T-joint. By so injecting a gas into a liquid stream through a multiplicity of small orifices, a foam is thus produced, having a substantially smaller apparent density than the unmodified liquid. Greatest efficiency is obtained by using an insoluble gas, but the action is not prevented by partial solubility. By varying the amount of helium gas flowing into the foaming device, the consistency of the foam will be caused to vary. Thus, as more helium gas is injected, a greater foaming action occurs resulting in a decrease of the propellant flow to the injector.

Alternative to the particular method described herein, the foaming could be accomplished at the outlet of the storage vessel or at the entrance or exit of a turbopump. Also, the herein disclosed method could be used to control the flow to a gas generator which drives a turbopump set. An additional adaptation of the foam theory would be to generate the foam in situ in a solid propellant rocket during the liquid curing stage whereby it would be possible to pre-program thrust variations in such devices.

Obviously, many modifications and variations of the present invention are possible in the light of the above teachings. It is, therefore, to be understood that within the scope of the attendant claims the invention may be practiced otherwise than as specifically described.

What is claimed is:

1. A method for varying the thrust of a propulsive device which method comprises injecting an inert gas into a propellant causing said propellant to foam and subsequently using said foamed propellant to power said propulsive device whereby the thrust produced by said propulsive device varies proportionately to the amount of foaming action.

2. A method for varying the thrust of a liquid propellant propulsive device which method comprises injecting an inert gas into a propellant causing said propellant to foam and subsequently feeding the foamed propellant into said propulsive device whereby the quantity of propellant entering said propulsive device decreases as the foaming action increases.

3. A method for varying the thrust of a liquid propellant propulsive device which method comprises storing the fuel and oxidizer components under pressure of an inert gas, feeding said fuel and oxidizer to said propulsive device, injecting an inert gas into said fuel and oxidizer being fed thereby causing said fuel and oxidizer to foam prior to the fuel and oxidizer entering said propulsive device, whereby the quantity of fuel and oxidizer entering said propulsive device decreases as the foaming action increases.

No references cited.